United States Patent
Horvath

(10) Patent No.: US 8,811,265 B2
(45) Date of Patent: Aug. 19, 2014

(54) AD-HOC SECURE COMMUNICATION NETWORKING BASED ON FORMATION FLIGHT TECHNOLOGY

(75) Inventor: John M. Horvath, Newcastle, WA (US)

(73) Assignee: Honeywell International Inc., Morristown, NJ (US)

(*) Notice: Subject to any disclaimer, the term of this patent is extended or adjusted under 35 U.S.C. 154(b) by 390 days.

(21) Appl. No.: 11/875,662

(22) Filed: Oct. 19, 2007

(65) Prior Publication Data

US 2009/0103452 A1 Apr. 23, 2009

(51) Int. Cl.
*H04B 7/185* (2006.01)
*H04W 84/06* (2009.01)

(52) U.S. Cl.
CPC .................................. *H04W 84/06* (2013.01)
USPC ............................ 370/316; 370/338; 370/328

(58) Field of Classification Search
None
See application file for complete search history.

(56) References Cited

U.S. PATENT DOCUMENTS

| | | | |
|---|---|---|---|
| 4,414,661 A * | 11/1983 | Karlstrom | 370/332 |
| 4,901,307 A | 2/1990 | Gilhousen et al. | |
| 5,095,480 A | 3/1992 | Fenner | |
| 5,530,909 A * | 6/1996 | Simon et al. | 455/11.1 |
| 5,710,764 A | 1/1998 | Yoshimura et al. | |
| 5,835,059 A | 11/1998 | Nadel et al. | |
| 6,018,659 A * | 1/2000 | Ayyagari et al. | 455/431 |
| 6,047,165 A | 4/2000 | Wright et al. | |
| 6,064,335 A | 5/2000 | Eschenbach | |
| 6,084,870 A * | 7/2000 | Wooten et al. | 370/349 |
| 6,104,712 A | 8/2000 | Robert et al. | |
| 6,108,539 A | 8/2000 | Ray et al. | |
| 6,147,980 A | 11/2000 | Yee et al. | |
| 6,148,179 A | 11/2000 | Wright et al. | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |

(Continued)

FOREIGN PATENT DOCUMENTS

| | | |
|---|---|---|
| EP | 967815 | 12/1999 |
| EP | 1793512 | 6/2007 |

(Continued)

OTHER PUBLICATIONS

"The ATN SARPs Third Edition", "Manual of Technical Provisions for the Aeronautical Telecommunications Network—ICAO DOC 9705/AN956", Publisher: ATN.

(Continued)

*Primary Examiner* — Ayaz Sheikh
*Assistant Examiner* — Faiyazkhan Ghafoerkhan
(74) *Attorney, Agent, or Firm* — Fogg & Powers LLC

(57) ABSTRACT

An ad-hoc secure communication network and methods of communicating with a fleet of vehicles using the ad-hoc communication network is provided. The method includes communicating relatively long range communication signals to a fleet router. The fleet router is a select one of the vehicles in the fleet. The method further includes forming an ad-hoc communication network between the fleet vehicles to communicate relatively short range communication signals between the vehicles in the fleet. Wherein each vehicle in the fleet uses surveillance information to determine the network topology and each vehicle routes messages based on the discovered network topology.

16 Claims, 3 Drawing Sheets

(56) References Cited

U.S. PATENT DOCUMENTS

| | | | |
|---|---|---|---|
| 6,262,659 B1 | 7/2001 | Korkosz et al. | |
| 6,271,768 B1 | 8/2001 | Frazier, Jr. et al. | |
| 6,285,878 B1 | 9/2001 | Lai | |
| 6,308,044 B1 | 10/2001 | Wright et al. | |
| 6,353,779 B1 | 3/2002 | Simon et al. | |
| 6,438,468 B1 | 8/2002 | Muxlow et al. | |
| 6,477,152 B1 | 11/2002 | Hiett | |
| 6,606,055 B2 | 8/2003 | Halsema et al. | |
| 6,643,274 B2 | 11/2003 | D'Annunzio | |
| 6,677,888 B2* | 1/2004 | Roy | 342/36 |
| 6,744,396 B2 | 6/2004 | Stone et al. | |
| 6,778,825 B2 | 8/2004 | Parkman | |
| 6,781,513 B1 | 8/2004 | Korkosz et al. | |
| 6,788,935 B1 | 9/2004 | McKenna et al. | |
| 6,795,408 B1 | 9/2004 | Hiett | |
| 6,810,527 B1 | 10/2004 | Conrad et al. | |
| 6,816,728 B2 | 11/2004 | Igloi et al. | |
| 6,819,670 B1 | 11/2004 | Fenner | |
| 6,915,189 B2 | 7/2005 | Igloi et al. | |
| 6,925,088 B1 | 8/2005 | Moreaux | |
| 6,931,248 B2 | 8/2005 | Borel | |
| 6,940,832 B2* | 9/2005 | Saadawi et al. | 370/328 |
| 6,965,816 B2 | 11/2005 | Walker | |
| 6,970,444 B2 | 11/2005 | Chwieseni et al. | |
| 6,990,319 B2 | 1/2006 | Wright et al. | |
| 7,027,812 B2 | 4/2006 | Dastrup et al. | |
| 7,072,977 B1* | 7/2006 | Bernard et al. | 709/238 |
| 7,085,290 B2 | 8/2006 | Cain et al. | |
| 7,085,562 B1* | 8/2006 | Holder et al. | 455/431 |
| 7,116,266 B1* | 10/2006 | Vesel et al. | 342/30 |
| 7,177,295 B1* | 2/2007 | Sholander et al. | 370/338 |
| 7,177,939 B2 | 2/2007 | Nelson et al. | |
| 7,181,160 B2 | 2/2007 | Barrett | |
| 7,187,927 B1 | 3/2007 | Mitchell | |
| 7,343,157 B1 | 3/2008 | Mitchell | |
| 7,398,050 B2 | 7/2008 | Walker | |
| 7,454,203 B2 | 11/2008 | Levitan | |
| 7,463,890 B2 | 12/2008 | Herz et al. | |
| 7,519,014 B2 | 4/2009 | Allen et al. | |
| 7,522,628 B1* | 4/2009 | Elliott | 370/437 |
| 7,599,314 B2 | 10/2009 | Wittenschlaeger | |
| 7,633,873 B1 | 12/2009 | Kohler et al. | |
| 7,643,426 B1 | 1/2010 | Lee et al. | |
| 7,729,263 B2 | 6/2010 | True et al. | |
| 7,751,815 B2 | 7/2010 | McKenna et al. | |
| 7,756,508 B1 | 7/2010 | Usher et al. | |
| 7,769,028 B2 | 8/2010 | Boley et al. | |
| 7,814,322 B2 | 10/2010 | Gurevich et al. | |
| 7,848,278 B2* | 12/2010 | Chen et al. | 370/328 |
| 7,876,736 B2 | 1/2011 | Inoue | |
| 7,894,475 B2 | 2/2011 | Bishop et al. | |
| 7,907,893 B2 | 3/2011 | Karabinis et al. | |
| 7,924,761 B1* | 4/2011 | Stevens | 370/315 |
| 7,940,669 B2 | 5/2011 | Vaswani et al. | |
| 8,023,936 B2* | 9/2011 | Hudson et al. | 455/421 |
| 8,190,147 B2* | 5/2012 | Kauffman et al. | 455/428 |
| 8,284,674 B2* | 10/2012 | True et al. | 370/238 |
| 8,570,990 B2 | 10/2013 | Kauffman | |
| 2002/0009993 A1 | 1/2002 | Dastrup et al. | |
| 2002/0168971 A1 | 11/2002 | Parkman | |
| 2002/0191573 A1 | 12/2002 | Whitehill et al. | |
| 2003/0003872 A1 | 1/2003 | Brinkley et al. | |
| 2003/0030581 A1* | 2/2003 | Roy | 342/36 |
| 2003/0053424 A1* | 3/2003 | Krishnamurthy et al. | 370/316 |
| 2003/0071743 A1 | 4/2003 | Seah et al. | |
| 2003/0072252 A1 | 4/2003 | Gurney | |
| 2003/0073406 A1 | 4/2003 | Benjamin et al. | |
| 2003/0158963 A1 | 8/2003 | Sturdy et al. | |
| 2003/0231574 A1 | 12/2003 | Okuda et al. | |
| 2003/0231584 A1 | 12/2003 | Zeitfuss | |
| 2004/0008253 A1 | 1/2004 | Monroe | |
| 2004/0028003 A1 | 2/2004 | Diener et al. | |
| 2004/0132495 A1 | 7/2004 | Horton, Jr. et al. | |
| 2004/0157557 A1* | 8/2004 | Barnett et al. | 455/41.2 |
| 2004/0235469 A1 | 11/2004 | Krug | |
| 2005/0026609 A1 | 2/2005 | Brinkley et al. | |
| 2005/0053026 A1 | 3/2005 | Mullan et al. | |
| 2005/0054346 A1 | 3/2005 | Windham et al. | |
| 2005/0064895 A1 | 3/2005 | Oesterling et al. | |
| 2005/0090201 A1* | 4/2005 | Lengies et al. | 455/41.2 |
| 2005/0108374 A1 | 5/2005 | Pierzga et al. | |
| 2005/0143013 A1 | 6/2005 | Jha | |
| 2005/0174950 A1* | 8/2005 | Ayyagari | 370/254 |
| 2005/0197748 A1 | 9/2005 | Holst et al. | |
| 2005/0220055 A1 | 10/2005 | Nelson et al. | |
| 2005/0221814 A1 | 10/2005 | Fagan et al. | |
| 2005/0221818 A1 | 10/2005 | Johnson et al. | |
| 2005/0232185 A1* | 10/2005 | Hudson et al. | 370/328 |
| 2005/0234788 A1* | 10/2005 | Hudson et al. | 705/34 |
| 2005/0281270 A1 | 12/2005 | Kossi et al. | |
| 2005/0286452 A1 | 12/2005 | Hardgrave et al. | |
| 2006/0023677 A1 | 2/2006 | Labrador et al. | |
| 2006/0031394 A1 | 2/2006 | Tazuma | |
| 2006/0080451 A1 | 4/2006 | Eckert | |
| 2006/0098608 A1 | 5/2006 | Joshi | |
| 2006/0167618 A1 | 7/2006 | Werback | |
| 2006/0176842 A1 | 8/2006 | Tamura | |
| 2006/0178141 A1 | 8/2006 | McGuffin et al. | |
| 2006/0183474 A1* | 8/2006 | Ziarno et al. | 455/431 |
| 2006/0205345 A1 | 9/2006 | Ishikawa | |
| 2007/0042773 A1 | 2/2007 | Alcorn | |
| 2007/0042774 A1 | 2/2007 | Alcorn | |
| 2007/0072590 A1 | 3/2007 | Levitan | |
| 2007/0150939 A1 | 6/2007 | Aaron et al. | |
| 2007/0183435 A1 | 8/2007 | Kettering et al. | |
| 2007/0200761 A1 | 8/2007 | Smith | |
| 2007/0213009 A1 | 9/2007 | Higashida et al. | |
| 2007/0284474 A1 | 12/2007 | Olson et al. | |
| 2007/0286097 A1 | 12/2007 | Davies | |
| 2007/0297416 A1 | 12/2007 | Boley et al. | |
| 2008/0095134 A1* | 4/2008 | Chen et al. | 370/342 |
| 2008/0117858 A1 | 5/2008 | Kauffman | |
| 2008/0144617 A1 | 6/2008 | Molsberry et al. | |
| 2008/0150784 A1 | 6/2008 | Zhang et al. | |
| 2008/0151811 A1 | 6/2008 | El-Damhougy et al. | |
| 2008/0186897 A1 | 8/2008 | Rune et al. | |
| 2008/0186907 A1 | 8/2008 | Yagyuu et al. | |
| 2008/0205283 A1 | 8/2008 | McGuffin | |
| 2008/0240038 A1 | 10/2008 | Lynche et al. | |
| 2008/0240062 A1 | 10/2008 | Lynch et al. | |
| 2008/0274734 A1 | 11/2008 | Kostanic et al. | |
| 2008/0291843 A1 | 11/2008 | Sonnenberg et al. | |
| 2009/0005041 A1 | 1/2009 | Steinberg et al. | |
| 2009/0041041 A1 | 2/2009 | True et al. | |
| 2009/0058682 A1 | 3/2009 | True | |
| 2009/0077626 A1 | 3/2009 | Leclercq et al. | |
| 2009/0092074 A1 | 4/2009 | Jamalipour et al. | |
| 2009/0103452 A1 | 4/2009 | Horvath | |
| 2009/0103473 A1* | 4/2009 | Foster et al. | 370/316 |
| 2009/0141669 A1 | 6/2009 | Kauffman | |
| 2009/0197595 A1 | 8/2009 | Kauffman et al. | |
| 2009/0318137 A1 | 12/2009 | Kauffman et al. | |
| 2009/0318138 A1 | 12/2009 | Zeng et al. | |
| 2010/0057899 A1 | 3/2010 | Henkel | |
| 2010/0157905 A1 | 6/2010 | Ahn et al. | |
| 2010/0272012 A1 | 10/2010 | Knefelkamp et al. | |

FOREIGN PATENT DOCUMENTS

| | | |
|---|---|---|
| EP | 1850543 | 10/2007 |
| EP | 1926234 | 5/2008 |
| EP | 2051406 | 4/2009 |
| EP | 2051407 | 4/2009 |
| EP | 2068592 | 6/2009 |
| WO | 03053013 | 6/2003 |
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | WO 2007059560 A1 * | 5/2007 |
| WO | 2008007861 | 1/2008 |

(56) References Cited

OTHER PUBLICATIONS

AVIONICA, "Securelink", Jan. 2007, pp. 12, Publisher: AVIONICA.
Carlos Jodar et al., "Wi-Fi Gatelink Trial Frankfurt and Muich, Germany White Paper", Aug. 9, 2006, pp. 118, Publisher: Arinc Proprietary.
Eklund et al., "IEEE Standard 802.16: A Technical Overview of the Wirelessman Air Interface For Broadband Wireless Access", "IEEE Communications Magazine", Jun. 2002, pp. i-107, Publisher: IEEE.
Hardy et al., "Aircraft Network and File Server—ARINC 763", Oct. 16, 2002, pp. 1-12, Publisher: AEEC (Airlines Electronic Engineering Committee).
"Technical Overview for Mark III Communications Management Unit (CMU)", Jun. 23, 2002, pp. 1-59, Publisher: Honeywell Aerospace Electronic Systems.
Hurlburt et al., "A Data Communications Concept for a Sats Scenario", "4th Integrated CNS Technologies Conference and Workshop", Apr. 2004, pp. 1-20.
Ivancic, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.
Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.
Teledyne Technologies Inc., "New Release", "www.teledyne-controls.com/newscenter/sco.asp", 2007, pp. 1-2, Publisher: Teledyne Technologies Inc.
European Patent Office, "Communication under Rule 71(3) EPC", "from Foreign Counterpart of U.S. Appl. No. 12/143,369", Nov. 26, 2012, pp. 1-27, Published in: EP.
European Patent Office, "European Search Report", "from Foreign Counterpart of U.S. Appl. No. 11/875,660", Apr. 10, 2012, pp. 1-3, Published in: EP.
European Patent Office, "Office Action", "from Foreign Counterpart of U.S. Appl. No. 11/875,660", May 3, 2012, Published in: EP.
European Patent Office, "Office Action", "from Foreign Counterpart of U.S. Appl. No. 11/875,660", Sep. 13, 2012, pp. 1-3, Published in: EP.
U.S. Patent and Trademark Office, "Advisory Action", "U.S. Appl. No. 11/875,660", Apr. 14, 2011, pp. 1-3.
U.S. Patent and Trademark Office, "Advisory Action", "U.S. Appl. No. 11/875,660", Feb. 22, 2012, pp. 1-13.
U.S. Patent and Trademark Office, "Examiner's Answer", "U.S. Appl. No. 11/875,660", Aug. 16, 2012, pp. 1-16.
U.S. Patent and Trademark Office, "Final Office Action", "U.S. Appl. No. 11/875,660", Feb. 1, 2011, pp. 1-19.
U.S. Patent and Trademark Office, "Final Office Action", "U.S. Appl. No. 11/875,660", Dec. 7, 2011, pp. 1-21.
U.S. Patent and Trademark Office, "Office Action", "U.S. Appl. No. 11/875,660", Sep. 17, 2010, pp. 1-36.
U.S. Patent and Trademark Office, "Office Action", "U.S. Appl. No. 11/875,660", Jun. 20, 2011, pp. 1-16.
European Patent Office, "Communication under Rule 71(3) EPC", "from Foreign Counterpart of U.S. Appl. No. 11/950,218", Apr. 5, 2011, pp. 1-21, Published in: EP.
European Patent Office, "Office Action", "from Foreign Counterpart of U.S. Appl. No. 11/950,218", Sep. 29, 2009, p. 1 Published in: EP.
European Patent Office, "Office Action", "from Foreign Counterpart of U.S. Appl. No. 11/950,218", May 26, 2010, pp. 1-3, Published in: EP.
European Patent Office, "Extended European Search Report", "from Foreign Counterpart of U.S. Appl. No. 11/950,218", Mar. 20, 2009, pp. 1-6, Published in: EP.
U.S. Patent and Trademark Office, "Advisory Action", "U.S. Appl. No. 11/950,218", Jun. 3, 2011, pp. 1-3.
U.S. Patent and Trademark Office, "Final Office Action", "U.S. Appl. No. 11/950,218", Apr. 11, 2011, pp. 1-13.
U.S. Patent and Trademark Office, "Notice of Allowance", "U.S. Appl. No. 11/950,218", Jan. 7, 2013, pp. 1-15.
U.S. Patent and Trademark Office, "Office Action", "U.S. Appl. No. 11/950,218", Nov. 1, 2010, pp. 1-30.
U.S. Patent and Trademark Office, "Office Action", "U.S. Appl. No. 11/950,218", Aug. 28, 2012, pp. 1-27.
European Patent Office, "Office Action", "from Foreign Counterpart of U.S. Appl. No. 12/025,685", Sep. 11, 2009, p. 1 Published in: EP.
European Patent Office, "Office Action", "from Foreign Counterpart of U.S. Appl. No. 12/025,685", Jan. 23, 2012, pp. 1-6, Published in: EP.
European Patent Office, "European Search Report", "from Foreign Counterpart of U.S. Appl. No. 12/025,685", May 8, 2009, pp. 1-6, Published in: EP.
U.S. Patent and Trademark Office, "Advisory Action", "U.S. Appl. No. 12/025,685", Jun. 1, 2012, pp. 1-2.
U.S. Patent and Trademark Office, "Final Office Action", "U.S. Appl. No. 12/025,685", Mar. 30, 2012, pp. 1-15.
U.S. Patent and Trademark Office, "Final Office Action", "from U.S. Appl. No. 12/025,685", May 7, 2013, pp. 1-13, Published in: US.
U.S. Patent and Trademark Office, "Office Action", "U.S. Appl. No. 12/025,685", Sep. 28, 2011, pp. 1-28.
U.S. Patent and Trademark Office, "Office Action", "U.S. Appl. No. 12/025,685", Sep. 11, 2012, pp. 1-15.
U.S. Patent and Trademark Office, "Office Action", "from U.S. Appl. No. 12/025,685", Aug. 30, 2013, pp. 1-11, Published in: US.
European Patent Office, "Office Action", "from Foreign Counterpart of U.S. Appl. No. 12/143,369", Nov. 13, 2009, pp. 1-6, Published in: EP.
European Patent Office, "Office Action", "from Foreign Counterpart of U.S. Appl. No. 12/143,369", Jun. 25, 2010, pp. 1-4, Published in: EP.
European Patent Office, "Office Action", "from Foreign Counterpart of U.S. Appl. No. 12/143,369", Apr. 8, 2011, pp. 1-4, Published in: EP.
European Patent Office, "European Search Report", "from Foreign Counterpart of U.S. Appl. No. 12/143,369", Sep. 25, 2009, pp. 1-3, Published in: EP.
U.S. Patent and Trademark Office, "Final Office Action", "U.S. Appl. No. 12/143,369", Sep. 20, 2011, pp. 1-16.
U.S. Patent and Trademark Office, "Notice of Allowance", "U.S. Appl. No. 12/143,369", Apr. 12, 2012, pp. 1-12.
U.S. Patent and Trademark Office, "Office Action", "U.S. Appl. No. 12/143,369", Apr. 14, 2011, pp. 1-34.
Drula et al., "Adaptive Energy Conserving Algorithms for Neighbor Discovery in Opportunistic Bluetooth Networks", "IEEE Journal on Selected Areas in Communications", Jan. 2007, pp. 96-107, vol. 25, No. 1, Publisher: IEEE.
Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.
Mouza et al. "Mobility Patterns", "Proceedings of the Second Workshop on Spatio-Temporal Database Management", Jul. 23, 2004, pp. 1-8, Published in: Toronto, Canada.
Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.
Sakhaee et al., "Aeronautical ad hoc Networks", "Wireless Communications and Networking Conference", Jan. 1, 2006, pp. 246-251, Publisher: IEEE, Published in: Piscataway, NJ.
Samal, "Mobility Pattern Aware Routing in Mobile Ad Hoc Network", May 2003, pp. 1-82, Publisher: Virginia Polytechnic Institute and State University, Published in: Blacksburg, Virginia.
Vyas et al., "Location and Mobility Pattern Based Routing Algorithm for Mobile Ad Hoc Wireless Networks", "http://www.scs.org/getDoc.cfm?id=2466", 2003, pp. 695-700, Publisher: The Society for Modeling and Simulation International.
Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.

(56) References Cited

OTHER PUBLICATIONS

European Patent Office, "Office Action", "from Foreign Counterpart of U.S. Appl. No. 11/875,662", May 3, 2012, pp. 1-5, Published in: EP.

European Patent Office, "European Search Report", "from Foreign Counterpart of U.S. Appl. No. 11/875,662", Apr. 5, 2012, pp. 1-3, Published in: EP.

U.S. Patent and Trademark Office, "Office Action", "U.S. Appl. No. 12/143,369", Dec. 9, 2011, pp. 1-17.

European Patent Office, "Communication under Rule 71(3) EPC", "from Foreign Counterpart of U.S. Appl. No. 11/875,660", Mar. 26, 2013, pp. 1-20, Published in: EP.

U.S. Patent and Trademark Office, "Pre-Appeal Brief Decision", "U.S. Appl. No. 11/875,660", Apr. 23, 2012, pp. 1-2.

European Patent Office, "Communication under Rule 71(3) EPC", "from Foreign Counterpart of U.S. Appl. No. 11/875,662", Feb. 14, 2013, pp. 1-21, Published in: EP.

European Patent Office, "Office Action from EP Application No. 09151372.1 mailed Feb. 3, 2014", "from Foreign Counterpart of U.S. Appl. No. 12/025,685", Feb. 3, 2014, pp. 1-4, Published in: EP.

U.S. Patent and Trademark Office, "Office Action", "from U.S. Appl. No. 12/025,685", Feb. 19, 2014, pp. 1-15, Published in: US.

\* cited by examiner

US 8,811,265 B2

AD-HOC SECURE COMMUNICATION NETWORKING BASED ON FORMATION FLIGHT TECHNOLOGY

BACKGROUND

Some aircraft and other military vehicles are designed to keep their detection from their enemy secret. For example, planes are made stealth so they are difficult to pick up by radar. Similarly submarines are made stealth to reduce noises made as they travel through the water. Likewise tanks are colored to match the color of their surroundings. One method used to determine the presence of military vehicles in a fleet is by monitoring communications between command centers and vehicles or between vehicles in the fleet. Even if the communications are encrypted, the number of vehicles in the fleet can be determined based on the number of communication signals to and between the fleet members. Moreover, the discovery of the number of vehicles in a fleet can seriously hamper operations of a mission.

For the reasons stated above and for other reasons stated below which will become apparent to those skilled in the art upon reading and understanding the present specification, there is a need in the art for a method to prevent the number of vehicles in a fleet from be detected by communication signals.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of communicating with a fleet of vehicles is provided. The method includes communicating relatively long range communication signals to a fleet router. The fleet router is a select one of the vehicles in the fleet. The method further includes forming an ad-hoc communication network with the vehicles to communicate relatively short range communication signals between the vehicles in the fleet. Wherein each vehicle in the fleet uses detected surveillance information to determine the network topology and each vehicle routes messages based on the discovered network topology.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of keeping the communications between members of a fleet of vehicles undetectable at a distance. This prevents the practice of communication surveillance in determining the number of vehicles in a fleet. In one embodiment, one of the vehicles is designated as a fleet router. The fleet router maybe in communication with a ground station via secure Aircraft Communication Addressing Reporting System (ACARS). An ACARS typically communicates with relatively long range radio or satellite signals. The fleet router forms an ad-hoc communication network with other vehicles in the fleet. Communication between the vehicles in the ad-hoc network is with the use of relatively short range very high frequency (VHF) communication signals. In embodiments, the ad-hoc communication network is formed using transmitted position and ID information from surveillance equipment on each of the vehicle to discovery the topology of the network. Based on the topology, communication signals are passed to a destination vehicle (node).

Figure 1:
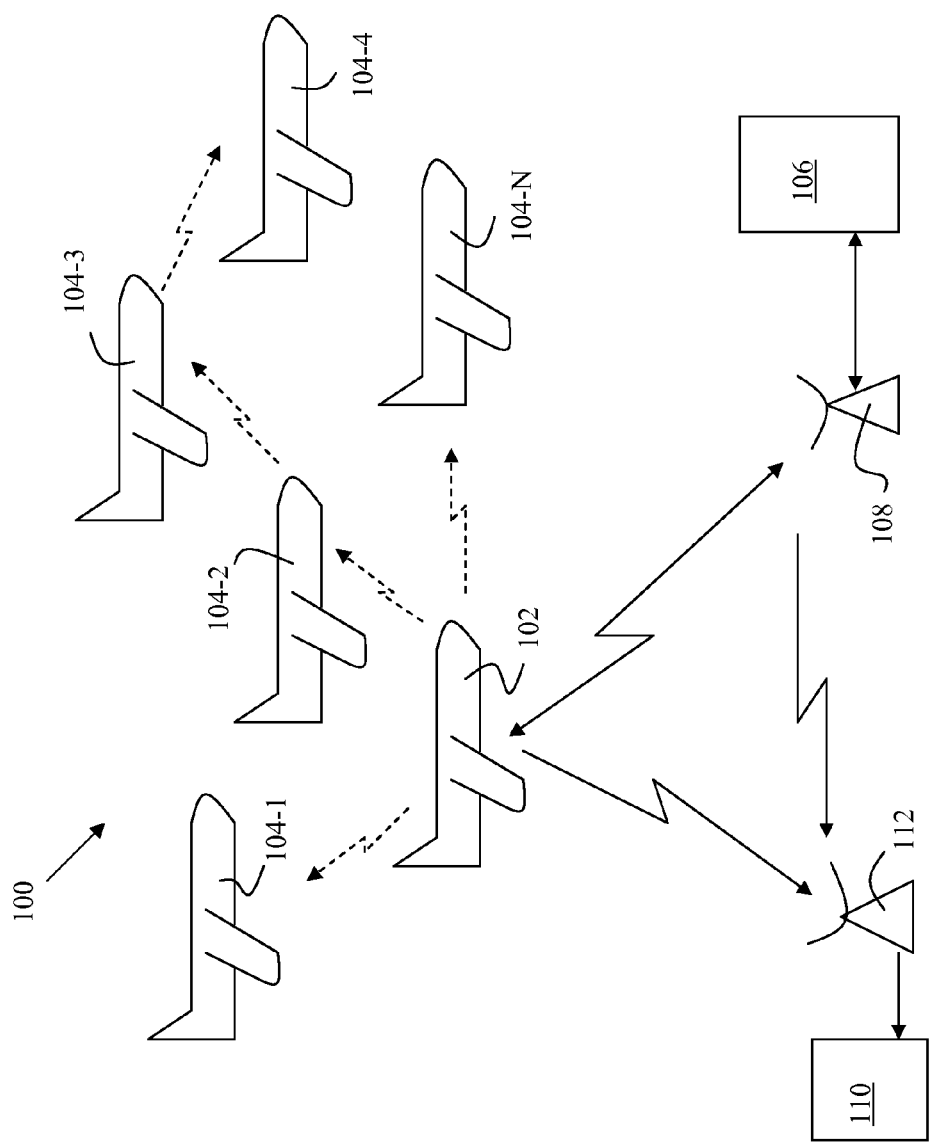
FIG. 1 is an illustration of a fleet of vehicles using an ad-hoc communication network of one embodiment of the present invention.

Referring to FIG. 1, an illustration of a fleet of vehicles (in this example aircraft) that make an ad-hoc communication network 100 of one embodiment is shown. In this example, relatively strong signals, such as signals used with ACARS, are used to communicate between the fleet router 102 and a ground station 106. However, as also illustrated this relatively strong signal that is in communication between the fleet router 102 and a transceiver 108 of the ground station 106 can be detected by a receiver 112 of a detecting system 110. In embodiments, the communication exchange between the flight router 102 and the ground station 106 are the only communications the detecting system 110 can detect. These ACARS communications are encrypted so the content of the message cannot be determined. However, as stated above, the detecting system will be able to determine that a vehicle (in this case the fleet router 102) is in communication with a ground station 106. In embodiments, relatively short range signals such as VHF communication signals are used to communicate between vehicles in the fleet. An ad-hoc communication network 100 of vehicles (102 and 104-1 through N) are used to pass communication messages between vehicles in the fleet. The vehicles 102 and 104-1 through 104-1 can be generally referred to as communication nodes, or simply nodes 102 and 104-1 through 104-N. Further, in embodiments, network topology is discovered using surveillance signals generated by internal surveillance equipment in each member of the fleet. Hence, communication messages between nodes do not need long headers setting out location information to determine topology. Other short range point to point communication methods besides VHF communication systems are contemplated which include but are not limited to high frequency (HF) communication systems, microwave communication systems, other radio frequency (RF) communication systems as well computer controlled laser communication systems.

In the example of FIG. 1, the ground station 106 needs to send a message to all of the vehicles (nodes) 120 and 104 (1-N) in the fleet. As illustrated, the message is first sent to the fleet router 102 via ACARS communication signal. The fleet router 102 then determines the network topology of the fleet determining the most efficient and reliable route to send the message to the other members of the fleet. In this example, vehicles 104-1, 104-2 and 104-N are in direct communication range of the fleet router 102. Hence the fleet router based on the determined topology sends the communication message to vehicles 104-1, 104-2 and 104-N directly. Further based on the topology, the fleet router 102, directs vehicle (or node) 104-2 to pass the message on to node 104-3 and node 104-4. Once node 104-2 has the message, node 104-2 will determine the then current topology of the fleet. Based on the topology, node 104-2 will determine the most efficient and reliable route. In this example, node 104-3 is in range of node 104-2 and so the message is directly sent to node 104-3. However, node 104-4 is not within its VHF communication range. However, in this example, node 104-2 determined based on the topology that a path through 104-3 was the most efficient and reliable route to node 104-4. Therefore the message to node 104-4 is passed to node 104-3. Node 104-3 will then determine the then current topology as discussed above and the message will be sent based on the most efficient and reliable route. In this example, node 104-4 is in range of node 104-3 and a direct communication path is used. Since communications between members of the node have a relatively short range, the detecting system 110 cannot detect them. Hence the only communication signal detected by the detecting system 110 is the communication between the fleet router 102 and the ground station 106 and therefore the total number of vehicles in the fleet cannot be determined by communication signals.

Figure 2:
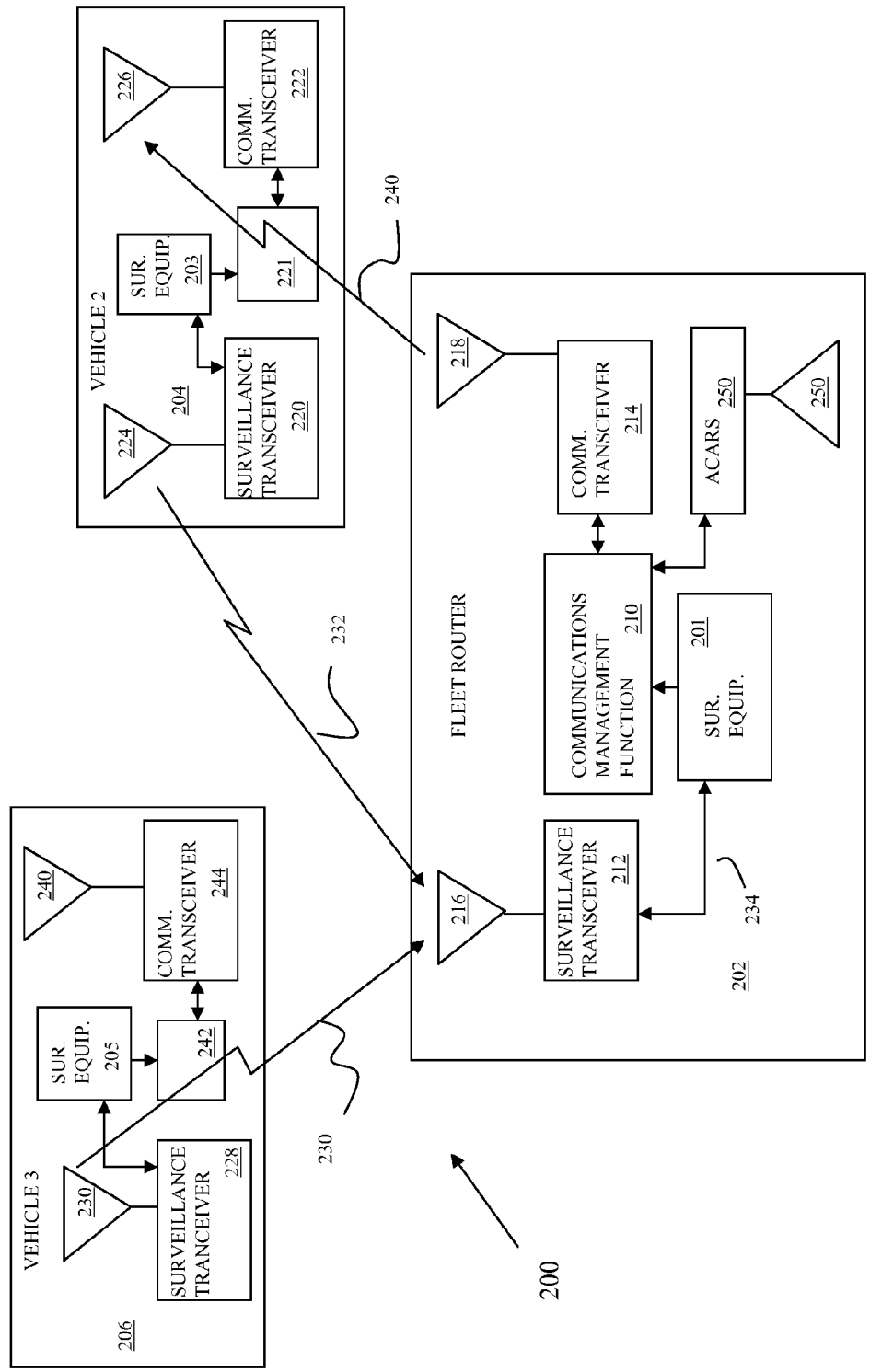
FIG. 2 is a block diagram of the communication system of some vehicles that make up the ad-hoc communication network of one embodiment of the present invention.

FIG. 2 illustrates an ad-hoc communication network 200 that communicates between the vehicles (or nodes) using the relatively short range communication signals. The communication network 200 in this example is made up of aircraft 202, 204 and 206. It will be understood that the block diagrams only show portions of the aircraft 202, 204 and 206 that are relevant to the current invention. In this example, the first aircraft 202, the fleet router 202, wants to send a message via the ad-hoc communication network 200. The first aircraft 202 is illustrated has having surveillance equipment 201, a communications management function (CMF) 210, a surveillance transceiver 212, a surveillance antenna 216, a communication transceiver 214, a communication antenna 218, an ACARS 250 and an ASCAR transceiver 252. The ACARS system is used for relatively long communication signals. Other types of communication systems could be used. The surveillance equipment 201 may be a transponder system or the like. The second aircraft 204 is illustrated as having surveillance equipment 203, a CMF 221, surveillance transceiver 220, surveillance antenna 224, communication transceiver 222 and communication antenna 226. Likewise, the third aircraft 206 is illustrated as including surveillance equipment 205, CMF 242, surveillance transceiver 228, surveillance antenna 230, communication transceiver 244 and communication antenna 240. It will be understood that the second and third aircrafts 204 and 206 would also include ACARS systems (not shown) although they would not use them for communication unless they were designated as the fleet router.

The surveillance equipment 201, 203 and 205 is used by the respective aircraft 202, 204 and 206 to periodically broadcast at least their position and ID to other aircraft and ground systems. An example of a type of surveillance equipment 201 is an Automatic Dependant Surveillance-Broadcast (ADS-B). The primary purpose of the ADS-B is to create traffic situational awareness for both pilots and air traffic controllers. Another example of surveillance equipment is Traffic Conflict and Advisory Systems (TCAS). A TCAS system provides positional data of an aircraft in response to an interrogation by another aircraft with a TCAS interrogator. Yet another example of a planned surveillance system is an Automatic Dependant Surveillance-Rebroadcast (ADS-R). An ADS-R transmits positional and flight intent data to aircraft from multiple sources of data, originating from an airborne surveillance source, ground based surveillance source or both. Embodiments of the present invention use data from the surveillance equipment for topology discovery.

In the example of FIG. 2, the surveillance equipment 205 of the third aircraft 206 provides information such as its ID and position, its speed, its heading and its intent to the surveillance transmitter 228. Surveillance transmitter 228 sends out a message 230 via surveillance antenna 230 relating to the information. This message is received by the surveillance transceiver 212 via surveillance antenna 216 of the first aircraft 202. Also illustrated, is surveillance equipment 203 in the second aircraft 204 that provides at least position and ID information to its surveillance transceiver 220. Surveillance transceiver 220 transmits message 232 that includes the at least position and ID information to the surveillance transceiver 212 of the first aircraft 202 via surveillance antenna 216. Hence in this example, the first aircraft 202 has location information from both the second and third aircraft 204 and 206. The CMF 210 of the first aircraft takes the location information 234 from the second and third aircraft 204 and 206 and creates a topology of the communication network 200. The CMF 210 uses the discovered topology to determine where to send its communication signal 240. In the example of FIG. 2, the CMF 210 determined the second aircraft 204 provided the best path for its communication signal 240 based on the discovered topology.

The first aircraft 202 uses its communication transceiver 216 to transmit the communication signal 240 to the second aircraft 204 via communication antenna 218. The second aircraft 204 receives the communication signal 240 via its communication antenna 226 and its transceiver 222. The second aircraft 204 will then discover its network topology like the first aircraft 202 did, to determine where next to send the communication signal on its way to its destination. If the surveillance equipment in the aircraft is capable of providing full topology information (e.g. an ADS-B or ADS-R system where ground systems rebroadcast surveillance data), neighboring nodes (aircraft) and the entire network topology are determined using the surveillance data without the need for exchanging hello messages or topology information. This embodiment avoids all overhead associated with neighbor discovery. If the surveillance system(s) is/are only capable of providing neighbor information (e.g. an ADS-B system limited to exchange in surveillance data with other aircraft within communication range), neighbor nodes are determined using the surveillance data and the entire network topology is determined by exchanging topology information over the communication network. This embodiment avoids only the overhead associated with neighbor discovery. Although, this embodiment is less preferred it still provides a significant overhead reduction.

In reference to the surveillance transceivers 212, 220 and 228 and the communication transceivers 214, 222 and 244, the term "transceiver" is meant as a generic term that describes a combination unit with both transmitter and receiver functionality. However, as one skilled in the art would understand, the invention would work equally well if the transceiver function were physically represented in two separate units, one being a transmitter and the other being a receiver. Hence the present invention is not limited to transceivers.

Figure 3:
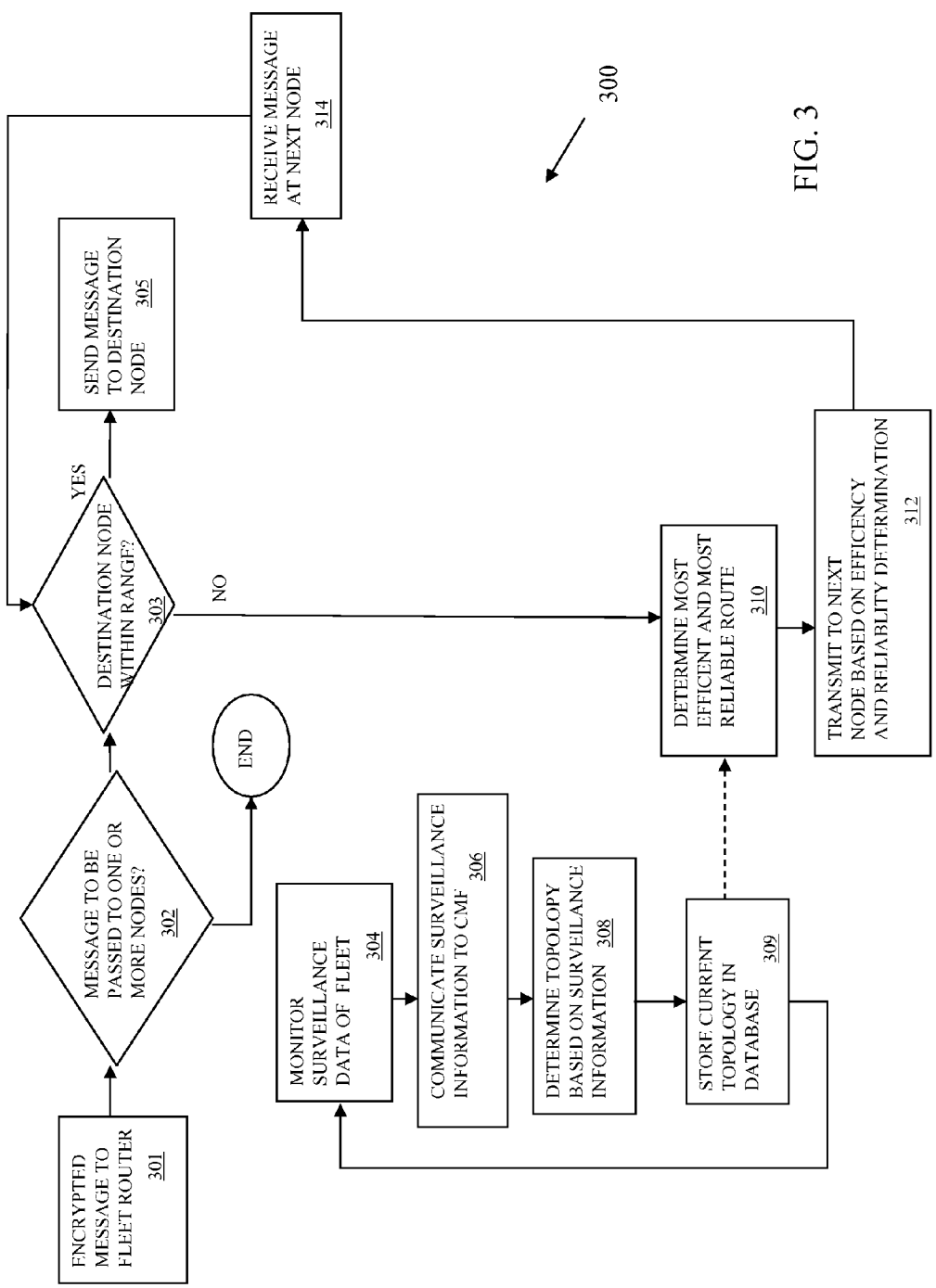
FIG. 3 is a flow diagram of one method of communicating messages within the fleet of vehicles of one embodiment of the present invention.

FIG. 3 illustrates a communication flow diagram 300 according to one embodiment. In this example of an embodiment, an encrypted message is sent to the fleet router (301). In one embodiment this is an ACARS communication signal (i.e. a radio or satellite signal). In other embodiments, other types of relatively long range signals that are encrypted are used to communicate signals to the fleet router. Once the message reaches the fleet router, the fleet router determines if the message is to be passed on to one or more of the nodes (302). If the message is not intended to be passed on (302), the process ends. However, if it is determined if the message is to be passed on (302), it is determined if the destination node (or nodes) are within range (303). If the destination node (or nodes) is within communication range, the message is sent to the destination node and the process ends (305). However, if the destination node (or nodes) is not within the communication range, an ad-hoc communication network is used to deliver the message. The ad-hoc communication network takes advantage of the continuous transmission of surveillance information by aircraft or other sources. As illustrated, in FIG. 3, each node monitors surveillance information of the fleet (304). The surveillance information is communicated to the CMF of the respective node (306). The current topology of the communication network is determined by the CMF based on the surveillance information (308). Then the current topology is stored in a database (309). This monitoring and storing, as illustrated, is continuously looped through at a select frequency rate by each member of the fleet. As further illustrated in the communication flow diagram 300 of FIG. 3, when the ad-hoc communication network is needed to deliver a message, the CMF of the node sending the message determines the most efficient and reliable route in the communication network based on the then current stored topology (310). The reliability and longevity of the network route for future message traffic to the same ground destination can be improved further by taking the intended trajectory of the other aircraft into account. This can be accomplished by using position data, aircraft intent data, and properties of the communication link, to predict when existing links will break, when new links will become available, and estimating aircraft-to-aircraft link reliability based on aircraft proximity. Once the most efficient and most reliable route is determined (310), the communication message is transmitted to the next selected node (312). Once, the communication message is received at the next node (314), the next node determines if it is within communication range of the destination node (301). The process continues until the message is received by the destination node (303).

The methods and techniques used by the CMF in each vehicle as described above in discovering the topology can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of communicating with a fleet of vehicles, the method comprising:
   designating a single vehicle of a fleet to be a fleet router, the fleet including a plurality of vehicles;
   routing long range communication through the fleet router, where all long range communication between individual vehicles within the fleet and any communication point outside of the fleet are routed through the fleet router, wherein none of the individual vehicles within the fleet except for the fleet router communicate directly with any communication point outside of the fleet, wherein the long range communication between the fleet router and any communication point outside of the fleet is detectable by one or more remotely located detecting systems; and
   forming an ad-hoc communication network with the plurality of vehicles of the fleet to communicate communication signals between the plurality of vehicles in the fleet, wherein each vehicle in the fleet uses detected surveillance information to determine the network topology and each vehicle routes messages based on the discovered network topology, wherein the communication signals between the plurality of vehicles in the fleet are not detectable by the one or more remotely located detecting systems, and wherein the detected surveillance information is detected by at least one vehicle within the plurality of vehicles and includes at least one of position, ID, speed, heading, and intended trajectory information for the plurality of vehicles.

2. The method of claim 1, further comprising:
   passing messages to one or more vehicles in the fleet from a ground station via the fleet router.

3. The method of claim 1, further comprising:
   generating surveillance messages with surveillance equipment in each aircraft in the fleet, wherein the surveillance messages provide the surveillance information used to determine the network topology; and communicating the surveillance messages between the plurality of vehicles using the surveillance equipment, wherein the surveillance equipment is different equipment from communications equipment used to communicate the communication signals.

4. The method of claim 1, further comprising:
encrypting the long range communication signals to the fleet router.

5. The method of claim 1, wherein the long range communication signals are at least one of radio and satellite signals.

6. The method of claim 1, wherein the short range communication signals are at least one of very high frequency (VHF) signals, high frequency (HF) signals, microwave signals, radio frequency (RF) signals and laser signals.

7. A method of communicating messages for a fleet of vehicles, the method comprising:
designating a single vehicle of a fleet to be a fleet router, the fleet including a plurality of vehicles;
determining a topology of an ad-hoc communication network formed between the plurality of vehicles in the fleet based on surveillance information detected by at least one vehicle within the plurality of vehicles and including at least one of position, ID, speed, heading, and intended trajectory information for the plurality of vehicles;
determining message routing between the plurality of vehicles and the fleet router based on the topology; and
transmitting communication messages between the plurality of vehicles using the determined message routing, wherein communication messages transmitted between the plurality of vehicles in the fleet are not detectable by one or more remotely located detecting systems; and
transmitting all communication messages originating from any vehicle of the plurality of vehicles for transmission to any communication point outside the fleet of vehicles through the fleet router, wherein none of the plurality of vehicles within the fleet except for the fleet router transmit any communication messages directly to any communication point outside of the fleet of vehicles, wherein the communication messages transmitted between the fleet router and any communication points outside of the fleet of vehicles is detectable by one or more remotely located detecting systems.

8. The method of claim 7, further comprising:
receiving all communication messages originating from any point outside the fleet of vehicles for transmission to any vehicle of the plurality of vehicles through the fleet router, wherein none of the plurality of vehicles within the fleet except for the fleet router receive any communication message directly from any communication point outside of the fleet of vehicles.

9. The method of claim 7, wherein determining a topology of an ad-hoc communication network of the vehicles in the fleet based on received surveillance information further comprises:
monitoring surveillance information of vehicles in the fleet using surveillance equipment;
communicating the surveillance information to a central management function (CMF) using surveillance equipment, wherein the surveillance equipment is different equipment from communications equipment used for transmitting communication messages between the plurality of vehicles;
determining the then current topology based on the surveillance information; and
storing the then current topology in a database.

10. The method of claim 7, wherein determining the topology of the ad-hoc communication network includes communicating the surveillance messages between the plurality of vehicles using surveillance equipment, wherein the surveillance equipment is different equipment from communications equipment used for transmitting communication messages between the plurality of vehicles.

11. The method of claim 7, wherein the communication signals transmitted between the fleet router and any communication point outside of the fleet of vehicles are ACARS communication signals and the communication signals transmitted between the plurality of vehicles are at least one of very high frequency (VHF) signals, high frequency (HF) signals, microwave signals, radio frequency (RF) signals and laser signals.

12. An ad-hoc secure vehicle communication network, the communication network comprising:
a plurality of vehicles, each vehicle including surveillance equipment to generate at least position and ID information regarding the respective vehicle, each vehicle further including a surveillance transmitter configured to transmit the at least position and ID information;
wherein a single vehicle of the plurality of vehicles is designated as a fleet router, wherein the fleet router is configured to communicate using a first communication system and a second communication system, the fleet router including a receiver configured to receive the at least position and ID information transmitted by the vehicles in the plurality of vehicles, the fleet router further comprising a communication management function (CMF) configured to determine an ad-hoc network topology based on the received position and ID information and determine communication routes based on the determined topology, the fleet router further configured to implement the second communication system when communicating based on the determined topology; and
wherein all communications between the plurality of vehicles and at least one communication point outside the plurality of vehicles is routed through the fleet router, wherein communications between the plurality of vehicles is by the first communication system and communications between the fleet router and the at least one communication point outside the plurality of vehicles is by the second communication system, wherein none of the plurality of vehicles except for the fleet router communicate directly with any communication point outside of the plurality of vehicles;
wherein communication between the fleet router and the at least one communication point outside the plurality of vehicles is detectable by one or more remotely located detecting systems; and
wherein communication between the plurality of vehicles is not detectable by the one or more remotely located detecting systems.

13. The communication network of claim 12, wherein each vehicle in the plurality of vehicles is configured to communicate over long distances with the first communication system and short distances with the second communication system, each vehicle including a receiver configured to receive the at least position and ID information transmitted by other vehicles in the plurality of vehicles, each vehicle further comprising a communication management function (CMF) configured to determine an ad-hoc network topology based on the received position and ID information and determine communication routes based on the determined topology, each vehicle further yet configured to implement the second communication system when communicating based on the determined topology.

14. The communication network of claim 12, further comprising:
   a ground station configured to communicate with the first communication system of the fleet router using encrypted messages.

15. The communication network of claim 12, wherein the first communication system is an ACARS communication system and the second communication system is a very high frequency (VHF) communication system.

16. The communication network of claim 12, wherein the surveillance equipment is configured to further generate at least one of speed information, heading information and intended trajectory information; and
   wherein the surveillance equipment and the surveillance transmitter are separate from equipment used in the first communication system or the second communication system.

* * * * *